INVENTOR
CURTIS C. STUEBER

United States Patent Office 3,451,458
Patented June 24, 1969

3,451,458
SILICA FILLED SYNTHETIC RUBBER COMPOSITIONS AND TIRE TREADS
Curtis C. Stueber, Cary, Ill., assignor to PPG Industries, Inc., Pittsburgh, Pa., a corporation of Pennsylvania
Continuation-in-part of application Ser. No. 89,363, Feb. 15, 1961. This application Mar. 16, 1965, Ser. No. 440,270
Int. Cl. B60c 5/00, 9/00, 11/00
U.S. Cl. 152—330
21 Claims

ABSTRACT OF THE DISCLOSURE

The wear resistance of silica-filled synthetic rubber compounds is enhanced by maintaining the compounds essentially free of metal oxide activator. The metal oxide-free compositions are particularly useful in the manufacture of tire treads.

---

Figure 1:
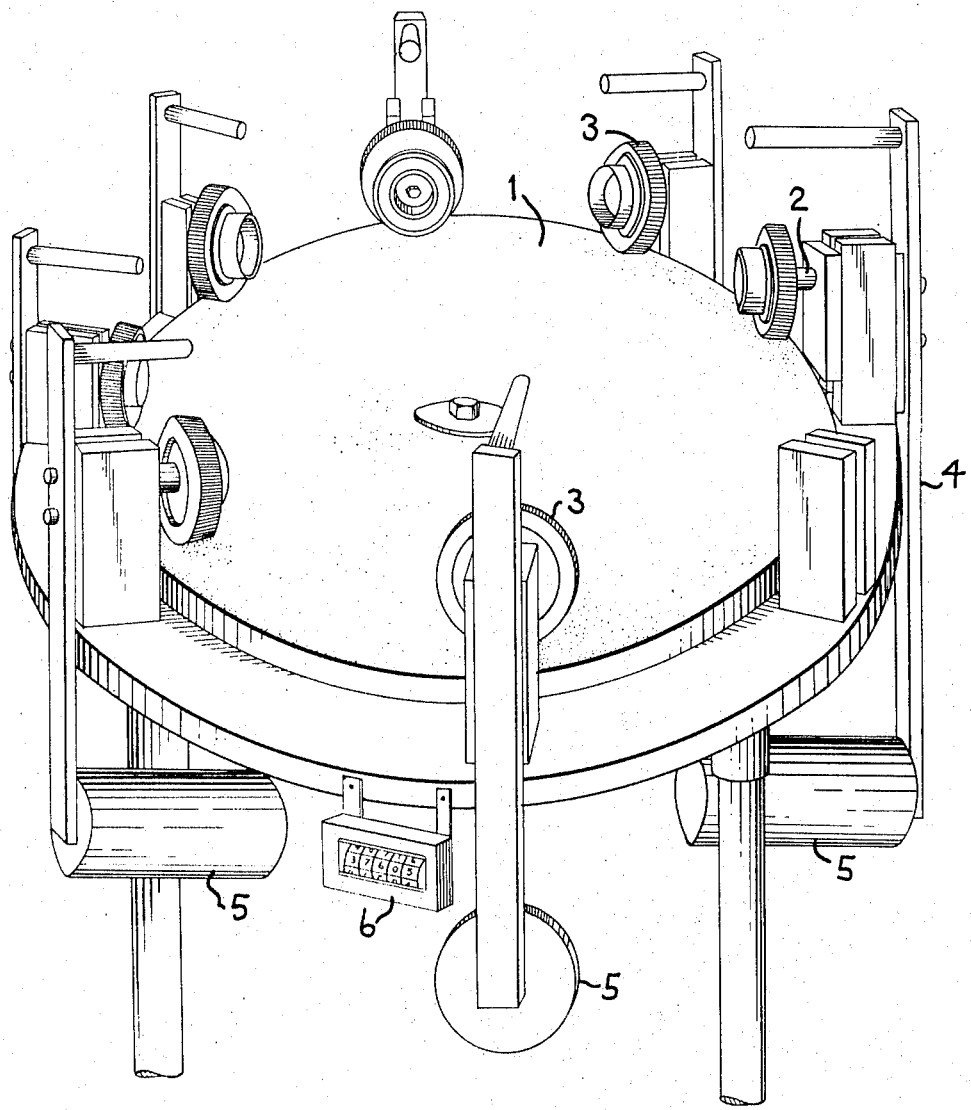

This application is a continuation-in-part of commonly assigned application Ser. No. 89,363, filed Feb. 15, 1961, now abandoned.

This invention relates to rubber compositions and vulcanizates thereof. More specifically, this invention relates to silica-reinforced rubber compositions, vulcanizates thereof and tires made from such vulcanizates.

Tire treads made from silica-reinforced synthetic rubber vulcanizates formulated and vulcanized following techniques generally applicable in providing carbon black-reinforced tire tread stocks often provide less durability than carbon black-reinforced tire treads. Nevertheless, there is a demand for silica-filled tire tread stock because of the peculiar advantages offered by silica as opposed to carbon black as a reinforcer or filler.

Silica-reinforced rubber tires are known to have good riding and knotty tear characteristics as compared to a comparably compounded carbon black-reinforced rubber tire. In addition, silica, by contrast to carbon, imparts a light color to the tires. Thus, white or colored tires may be made from silica-reinforced vulcanizates.

According to this invention, it is now possible to formulate a silica-reinforced synthetic rubber composition which after sulfur vulcanization can be molded into tire treads having wear resistance which compares most favorably with carbon black-reinforced tires. In addition, the silica-reinforced rubber compositions of this invention when vulcanized and utilized in tire treads retain the basic advantage heretofore recognized by the art.

A noteworthy characteristic of this invention is the significant increase obtained in modulus and tensile strength of the vulcanizates prepared in accordance herewith. The rubber compositions of this invention offer more varied application and widespread utilization with the vulcanizates due to the significant improvement of these properties. In addition to their usefulness in rubber tires, the vulcanizates are employable in making gaskets, seals and other molded objects.

The synthetic rubbers of this invention have a hydrocarbon skeletal chain and are homopolymers, copolymers, and terpolymers of ethylenically unsaturated compounds, at least one of which is a conjugated olefinic diene, for example, butadiene, isoprene and chloroprene. Examples of ethylenically unsaturated compounds of which these conjugated dienes may be polymerized to form a desired copolymer, terpolymer, etc., include styrene, acrylonitrile, vinyl chloride, vinylidene chloride, acrylic acid, methacrylic acid, vinyl acetate, methyl alpha-chloroacrylate, methyl acrylate, methyl methacrylate and isobutylene. As a rule, the polymers may contain from 0.001 to 100 percent by weight of the conjugated diene. Styrene-butadiene rubbers (SBR) are normally copolymers wherein 10 to 60 percent by weight of the copolymer is styrene and 90 to 40 percent by weight of the copolymer is butadiene. Butadiene-acrylonitrile copolymers conveniently contain 40 to 90 percent by weight of butadiene and 60 to 10 percent by weight of acrylonitrile, basis the weight of the polymer. Butyl rubber is conventionally prepared by polymerizing 0.01 to 4 percent by weight of $C_4$ to $C_{14}$ diolefin, e.g., butadiene or isoprene with isobutylene. Thus, the synthetic rubber polymers which are most desirable from the standpoint of this invention are those which are derived from a conjugated diene. Polybutadiene and polyisoprene having random stereospecificity are usable within the terms of this invention. By random stereospecificity, it is meant to include syndiotactic and atactic structures of the polymers. Most notable results are obtained with copolymers of butadiene and styrene.

The siliceous pigments preferably employed in this invention are those obtained from the precipitation of a soluble silicate according to the method described in U.S. Patent No. 2,940,830. These pigments have an $SiO_2$ content of at least 50 percent, usually greater than 80 percent by weight on an anhydrous basis, the silica concentration is preferably about 90 to 95 percent by weight of the pigment. Ideal silica pigments are, for example, those described in U.S. Patent No. 2,805,955. Silica-filled rubber compositions of the type contemplated by this invention are disclosed, for example, in U.S. Patents Nos. 2,692,869, 2,869,270, 2,692,871, 2,764,572, 2,805,955, 2,806,012, 2,812,232, 2,821,516, 2,837,495, 2,865,777, 2,865,780, 2,884,402, 2,892,807, 2,903,439, 2,905,567 and 2,914,503.

Although the silica fillers contemplated in this invention are desirably the hydrated silicas illustrated in the foregoing patents, anhydrous silica, silica aerogels and aerogels having acceptable particle size and surface area characteristics may be employed. Silica pigments having an ultimate particle size of from 15 to 50 millimicrons as determined by the electron miscroscope and a surface area of from about 50 to about 200 square meters per gram as determined by the recognized Brunauer-Emmett-Teller Method (BET Method) are ideal reinforcing siliceous materials. The BET Method is described in the "Journal of the American Chemical Society," vol. 60, p. 309 (1930).

Prior to this invention, metal oxide, e.g., zinc oxide, was considered a critical component in the manufacture of sulfur-cured silica-reinforced synthetic rubber vulcanizates containing the aforedisclosed silicas and rubbers. Metal oxide activator has heretofore been considered a necessary component in sulfur vulcanization of both synthetic and natural rubber compositions whether filled with carbon black or silica.

Surprisingly, it is found that the presence of a cure activator metal oxide such as zinc oxide in a sulfur vulcanizable silica reinforced synthetic rubber compound of the type disclosed herein, even in small amounts, lowers the percent modulus and tensile strength as well as the tread wearing resistance of a tire molded therefrom. Small amounts of zinc oxide, i.e., amounts below about 1 percent by weight per 100 parts of rubber, although detrimental to properties, are tolerable. It has been found that zinc oxide in amounts of as low as 0.5 part by weight per 100 parts of rubber adversely affects rubber tread-wearing properties of silica-reinforced synthetic rubbers. Thus, it is desirable to maintain silica-filled synthetic rubber compounds which are to be employed in the manufacture of tire treads essentially free of metal oxide activator. Superior results are obtained when a rubber compound contains no or essentially no metal oxide activator although amounts of from about 0.5 to 1.0 percent metal oxide activator are sometimes tolerable. The metal oxide activators contemplated by this invention in addition to zinc oxide include, for example, lead oxides, magnesium oxide, bismuth oxide, copper oxide, selenium oxides, and tellurium oxides.

It has been found that a silica reinforced synthetic rubber tire resulting from a metal oxide free vulcanizate evidences as high as 90 percent or more the tread wear resistance obtained from a corresponding carbon black-reinforced composition containing metal oxide. These metal oxide free treads evidence at least 10 to 20 percent more tread wear than a corresponding silicia-reinforced composition containing metal oxide. Silicia-reinforced synthetic rubber tires which are essentially free of metal oxide activator, i.e., contain less than about 0.5 part of metal oxide per 100 parts of rubber show marked improvement in percent modulus, tensile strength and tread wearing properties than comparable vulcanizates containing tradtional amounts, i.e., about 1.5 to about 5 parts of metal oxide per 100 parts of rubber, metal oxide activator.

Thus, according to this invention it has been discovered that while zinc oxide or comparable metal oxide cure activator is a necessary and valuable component in sulfur-vulcanization of carbon black-reinforced synthetic or natural rubber and while these metal oxide activators improve the properties of silica-reinforced natural rubber vulcanizates, these activators are actually detrimental to silica-reinforced synthetic rubbers.

The rubber compounds contemplated by the present invention may contain fatty acids. Typically they contain saturated fatty acids or hydrogenated rosin acids provided by the copolymer itself, usually no more than about 6 percent by weight basis the copolymer. Additional quantities of fatty acids or rosin acis, e.g., oleic, lauric, palmitic and/or cotton seed fatty acids are sometimes added to the compound.

A further embodiment of this invention comprises compounding a liquid non-reactive non-polar mineral oil into the zinc oxide free, sulfur vulcanizable, synthetic rubber composition. As a general rule, 2 to 10 parts of oil per 100 parts by weight of rubber polymer is sufficient to enhance the general properties of the rubber, especially the tread wearing properties. The oil may be added up to 50 parts to 100 parts of rubber.

The mineral oils contained in the receipe may be present as a result of having been added prior to the coagulation of the butadiene-styrene polymer. Thus, to a butadiene-styrene stripped latex having a high Mooney viscosity (ML-4 of 80–240) is added an emulsion of the mineral oil desired, generally in amounts of 25–50 parts per 100 parts of butadiene-styrene copolymer. The mixture is creamed and coagulated in the usual manner, and the polymer as crumb is dried in the usual way. On the other hand, when a lesser amount of oil is added to the compound, viz., 2 to 25 parts of oil to 100 parts by weight of rubber, it may be added during the compounding of the recipe in, for example, a Banbury mixer. Various techniques of adding the oils to rubber and various oils which may be so used are found in "Industrial and Engineering Chemistry," vol. 45, No. 5, pp. 1035 to 1053 (May 1953).

The mineral oils employable in this invention are hydrocarbons of complex molecular structure. These oils contain a composite of aromatic hydrocarbon and saturated cyclic and linear aliphatic groups. As a general rule, the oils contain up to 95 percent by weight aromatics and 5 to 100 percent by weight aliphatics. The linear aliphatic groups (paraffin chain carbons), which are generally alkyl groups of varying size, are present on an oil weight basis of up to 90 percent, and the cyclic aliphatics (naphthenes) are present on the order of from 5 to 90 percent by weight of the oil. Various oils of these types are commercially available on the market. Kurtz et al., Industrial and Engineering Chemistry, vol. 48, No. 12, pp. 2232 to 2234, December 1956, list a variety of available oils and their physical properties which may be used in the instant invention.

For light colored rubber stocks, for example, tires and other rubber molded objects, it is desirable to employ an oil having a low aromatic content, on the order of less than 20 percent by weight of the oil. If color is not a problem, then oils containing a higher aromatic content may be used. For most uses, oils containing in the order of 10 to 50 percent by weight aromatics are desirable.

The hydrocarbon (mineral) oils of this invention have viscosities in Saybolt Universal Seconds at 100° F. ranging from about 75 to 20,000. As a general rule, they have flash points in excess of 300° F. and a pour point of less than 70° F. The molecular weights of the oil may range from 225 to 700 or more. The viscosity-gravity constants of these oils generally range from 0.790 to 1.1. As a rule, the higher the aromatic content, the higher the viscosity-gravity constant. An oil having a viscosity-gravity constant in the range of 0.8 to 0.98 operates extremely well in the compositions and vulcanizates of this invention.

Though the mineral oil is considered solely hydrocarbon, it may contain some impurities, such as, bound nitrogen, sulfur, iron and copper. The sulfur content may be as high as 10 percent by weight of the oil without seriously injuring the properties of a rubber tire containing the same. In general, it is desirable to maintain an impurity level at less than 5 percent, basis weight of oil, preferably less than 1 percent.

For optimum tire tread wear of a tire containing the sulfur vulcanizate of this invention, it is preferred that the ratio of mineral oil to organic carboxylic acid is not less than 2:6 nor greater than 50:0, basis parts by weight of each per 100 parts of rubber polymer. In addition, it is preferred that this acid content be held to less than 2 parts per 100 parts of rubber when the oil content is greater than 15 parts per 100 parts of rubber.

The rubbers of this invention may be compounded with conventional activators, accelerators, plasticizers, antioxidants and reinforcing resins. The usable activators include triethanol amine; trigamine (a mixture of mono-, di- and tri-ethanol amines), pyridine, and carbowaxes. Usable accelerators include dicyclohexylamine, the variout thiazole-thiurams, for example, N-cyclohexyl-2-benzothiazole sulphenamide, N-tertiary-butyl-2-benzothiazole sulphenamide, N-tertiary-octyl-2-benzothiazole sulphenamide, N-oxydiethylenebenzothiazole - 2 - sulphenamide, N,N-diisopropylbenzothiazole-2-sulphenamide, etc. The guanidines, for example, diphenyl guanidine, di-ortho-tolyl guanidine; the various disulfides, such as 2-benzothiazole disulfide (mercaptobenzothiazole), tetramethylthiuram tetrasulfide, tetramethylthiuram disulfide, dipentamethylene thiuram tetrasulfide, tetraethylthiuram disulfide, 4,4'-dimorpholine disulfide and liquid aliphatic polysulfides; and aldehyde-amine reaction products such as hexamethylene tetramine, Trimene Base, which is an ethyl chloride, ammonia and formaldehyde reaction product, Hepteen Base, which is a heptaldehyde-aniline reaction product, and Beutene Base, which is a butyraldehyde-aniline reaction product. Thus, the conventional aldehyde-amine reaction products, thiazoles, thiurams, dicarbamates and guanidines are usable as activators in compounding the rubber compositions of this invention. These activators and accelerators may be utilized in amounts of 0.01 to 40 parts per 100 parts of rubber, though generally employed in the range of 0.1 to 10 parts per 100 parts of rubber. Preferably, they are employed in the range of 0.5 ot 2 parts per 100 parts of rubber. The weight of the activator or accelerator employed, if it contributes free sulfur to the vulcanization, is desirably determined based upon its weight of contained available free sulfur.

The cure system of this invention is based on free sulfur cross-linking. Thus, the above-noted polysulfide accelerators may be utilized alone or with elemental sulfur to achieve the desired vulcanization. Preferably, the vulcanization is achieved in the presence of elemental sulfur.

The amount of polysulfide accelerator when employed alone or the combined amount when used in combination with elemental sulfur is in the range of .01 to 40 parts by weight per 100 parts by weight of rubber, preferably between 1 to 4 parts by weight, which parts by weight of accelerator or the combination is based on the available free sulfur capable of being contributed to the cure. When elemental sulfur is employed alone, it may be added to the rubber composition in the same amounts by weight.

Anti-oxidants which are employable are the various amines, phenols and waxes well known for this purpose. An example of such an amine is phenyl-beta-naphthyl amine and a usable phenol is 2,2'-methylene-bis(4-methyl-6-tertiary-butyl phenol). The amount of anti-oxidants employed may vary in range from 0.001 to 10 parts per 100 parts of rubber, preferably 0.5 to 3 parts of anti-oxidant per 100 parts of rubber.

In addition to the above additives, extender fillers and other reinforcing fillers may be employed. The extenders are larger particle-sized, low surface area particulate materials which do not give significant reinforcing properties to the rubber yet are utilized due to their low cost.

Other reinforcing fillers which may be employed include carbon black. Silica pigment, preferably hydrated silica, may comprise at least about 10, preferably at least 25 percent by weight of the reinforcing filler content. By using, in accordance with this invention, a combination of silica and carbon black-reinforcing pigments, improved abrasion resistance results. The total filler concentration in the elastomer including silica may run from 5 to 200 parts by weight of filler to 100 parts by weight of rubber. The total reinforcing pigment content ranges from 5 to 100 parts per 100 parts of rubber by weight. Generally, the amounts of silica pigment employed run from 30 to 100 parts per 100 parts of rubber. On the average, 50 parts of silica is found most desirable. The extender fillers may be mixed with the silica and utilized within the terms of this invention or the silica may be employed alone. For optimum reinforcing of rubber it is desired to employ silica alone.

The curing system of this invention is based on vulcanization in the presence of sulfur. The following examples illustrate the manner in which representative rubber compositions are vulcanized and the properties of the vulcanizates.

EXAMPLE I

| Composition | A | B | C | D | E | F | G | H |
|---|---|---|---|---|---|---|---|---|
| Styrene-butadiene rubber containing 6% residual fatty acids, basis weight of rubber, and 23.5 percent by weight styrene, basis weight of polymer | 100.0 | 100.0 | 100.0 | 100.0 | 100.0 | 100.0 | 100.0 | 100.0 |
| Silica | 50.0 | 50.0 | 50.0 | 50.0 | 50.0 | 50.0 | 50.0 | 50.0 |
| 2,2'-methylene-bis(4-methyl-6-tertiary-butyl phenol) | 1.0 | 1.0 | 10.0 | 10.0 | 1.0 | 1.0 | 1.0 | 1.0 |
| Zinc oxide | | 5.0 | | 5.0 | | 5.0 | | 5.0 |
| Stearic Acid | | | 3.0 | 3.0 | | | 3.0 | 3.0 |
| Circo Light Oil (Light naphthenic petroleum oil) | 5.0 | 5.0 | 5.0 | 5.0 | 5.0 | 5.0 | 5.0 | 5.0 |
| N-cyclohexyl-2-benzothiazole sulphenamide | 1.5 | 1.5 | 1.5 | 1.5 | 1.5 | 1.5 | 1.5 | 1.5 |
| Diethylene glycol | | | | | 3.0 | 3.0 | 3.0 | 3.0 |
| Sulfur | 3.0 | 3.0 | 3.0 | 3.0 | 3.0 | 3.0 | 3.0 | 3.0 |

| Compound | Cure at 287° F. | Modulus: Stress-Strain Data (ASTM D412-51T) | | | | | Durometer Hardness A (ASTM D676-59T) | | Tear-Die A (ASTM D624-54) | Specific Gravity |
|---|---|---|---|---|---|---|---|---|---|---|
| | | 100% | 300% | 500% | Tensile | Elongation | 0' | 30' | | |
| A | 10 | Undercured | | | | | 64 | 36 | 30 | |
| | 20 | 100 | 140 | 220 | 470 | 1,400 | 64 | 45 | 150 | |
| | 30 | 110 | 240 | 460 | 1,490 | 1,080 | 66 | 51 | 250 | |
| | 45 | 140 | 400 | 820 | 2,860 | 930 | 66 | 53 | 320 | |
| | 90 | 210 | 670 | 1,570 | 3,180 | 740 | 71 | 61 | 280 | |
| | 135 | 270 | 910 | 2,110 | 3,120 | 600 | 72 | 65 | 240 | |
| | 180 | 300 | 1,030 | 2,460 | 3,720 | 600 | 73 | 66 | 230 | 1.16 |
| B | 10 | Undercured | | | | | 52 | 18 | 10 | |
| | 20 | Undercured | | | | | 52 | 17 | 10 | |
| | 30 | Undercured | | | | | 50 | 16 | 10 | |
| | 45 | Undercured | | | | | 52 | 20 | 10 | |
| | 90 | 60 | 60 | 110 | | ¹1,340 | 55 | 39 | 200 | |
| | 135 | 120 | 230 | 450 | 2,420 | 850 | 60 | 50 | 230 | |
| | 180 | 140 | 280 | 610 | 2,170 | 740 | 60 | 51 | 230 | 1.19 |
| C | 10 | Undercured | | | | | 62 | 34 | 30 | |
| | 20 | Undercured | | | | | 62 | 35 | 50 | |
| | 30 | 90 | 140 | 240 | 540 | 1,230 | 62 | 44 | 150 | |
| | 45 | 110 | 250 | 490 | 1,720 | 1,090 | 62 | 49 | 270 | |
| | 90 | 140 | 450 | 970 | 3,370 | 860 | 66 | 54 | 340 | |
| | 135 | 180 | 620 | 1,390 | 3,640 | 740 | 67 | 58 | 260 | |
| | 180 | 220 | 730 | 1,740 | 3,580 | 670 | 69 | 60 | 240 | 1.15 |
| D | 10 | Undercured | | | | | 45 | 7 | 10 | |
| | 20 | Undercured | | | | | 45 | 8 | 10 | |
| | 30 | Undercured | | | | | 44 | 10 | 10 | |
| | 45 | Undercured | | | | | 46 | 23 | 30 | |
| | 90 | 80 | 170 | 390 | 2,400 | 830 | 54 | 46 | 210 | |
| | 135 | 110 | 270 | 680 | 2,370 | 670 | 57 | 50 | 170 | |
| | 180 | 120 | 300 | 780 | 2,170 | 630 | 58 | 51 | 170 | 1.19 |
| E | 10 | Undercured | | | | | 55 | 25 | 30 | |
| | 20 | 90 | 150 | 320 | 1,630 | 1,120 | 58 | 40 | 180 | |
| | 30 | 130 | 340 | 800 | 2,830 | 800 | 62 | 50 | 190 | |
| | 45 | 150 | 500 | 1,170 | 3,120 | 710 | 65 | 54 | 200 | |
| | 90 | 200 | 690 | 1,720 | 3,150 | 620 | 65 | 59 | 180 | |
| | 135 | 250 | 800 | 2,170 | 3,080 | 560 | 69 | 62 | 180 | |
| | 180 | 270 | 900 | 2,440 | 2,920 | 530 | 72 | 65 | 170 | 1.16 |
| F | 10 | Undercured | | | | | 55 | 15 | 10 | |
| | 20 | Undercured | | | | | 52 | 22 | 10 | |
| | 30 | 120 | 240 | 530 | 2,750 | 800 | 60 | 52 | 270 | |
| | 45 | 170 | 420 | 1,210 | 2,470 | 610 | 65 | 59 | 200 | |
| | 90 | 200 | 460 | 1,330 | 2,060 | 540 | 67 | 60 | 170 | |
| | 135 | 180 | 460 | 1,390 | 2,260 | 560 | 66 | 60 | 170 | |
| | 180 | 190 | 460 | 1,340 | 1,920 | 550 | 67 | 57 | 180 | 1.20 |
| G | 10 | Undercured | | | | | 52 | 22 | 10 | |
| | 20 | 60 | 110 | 160 | (¹) | >1,360 | 55 | 35 | 150 | |
| | 30 | 90 | 220 | 520 | 2,520 | 900 | 56 | 44 | 210 | |
| | 45 | 110 | 360 | 820 | 3,000 | 780 | 59 | 50 | 210 | |
| | 90 | 150 | 520 | 1,260 | 3,250 | 680 | 62 | 54 | 190 | |
| | 135 | 170 | 620 | 1,620 | 2,950 | 610 | 65 | 59 | 190 | |
| | 180 | 190 | 660 | 1,810 | 3,070 | 600 | 65 | 59 | 180 | 1.16 |

| Compound | Cure at 287° F. | Modulus: Stress-Strain Data (ASTM D412-51T) | | | | | Durometer Hardness A (ASTM D676-59T) | | Tear-Die A (ASTM D624-54) | Specific Gravity |
|---|---|---|---|---|---|---|---|---|---|---|
| | | 100% | 300% | 500% | Tensile | Elongation | 0″ | 30 | | |
| H | 10 | Undercured | | | | | 55 | 20 | 10 [1] | |
| | 20 | Undercured | | | | | 56 | 25 | 10 [1] | |
| | 30 | 130 | 250 | 600 | 2,930 | 780 | 62 | 54 | 270 | |
| | 45 | 180 | 410 | 1,270 | 2,830 | 600 | 66 | 70 | 190 | |
| | 90 | 200 | 450 | 1,540 | 2,380 | 540 | 68 | 62 | 160 | |
| | 135 | 180 | 420 | 1,430 | 2,060 | 540 | 68 | 62 | 190 | |
| | 180 | 200 | 430 | 1,440 | 2,360 | 560 | 68 | 61 | 160 | 1.20 |

[1] No break.

NOTE.—The above ASTM Standards are contained in "A.S.T.M. Standards on Rubber Products," 19th ed., March 1960, published by the American Society for Testing Materials, Philadelphia, Pa.

Circo Light Oil, a product sold by the Sun Oil Company, Philadelphia, Pa., has the following typical properties:

| | |
|---|---|
| Specific gravity at 60° F. | 0.9230 |
| Viscosity, SUS at 100° F. | 156 |
| Flash Point, ° F. | 330 |
| Fire Point, ° F. | 370 |
| Pour Point, ° F. | −30 |
| Color, ASTM | 2.0 |
| Aniline point, ° F. | 156 |
| Refractive index | 1.5076 |
| Refractivity intercept | 1.0480 |
| Viscosity-gravity constant | 0.882 |
| Aromatic carbon atoms _____percent__ | 19 |
| Naphthenic carbon atoms _____do____ | 40 |
| Paraffinic carbon atoms _____do____ | 41 |
| Aromatics, silica gel _____ percent by weight__ | 43.3 |
| Billing weight _____lb./gal__ | 7.706 |

The following example shows the improved tread wearing characteristics of a tire made from the rubber vulcanizate within the terms of this invention.

EXAMPLE II

The following elastomeric compositions listed as U, V, W, X, Y and Z were compounded by conventional techniques and vulcanized under standard conditions at, for example, 287° F. Four identical commercial 8.00 x 15 automobile tires were made from these vulcanizates. Two separate vulcanizates were employed in molding a single tire, so that a ½ section of each tire was composed of a separate elastomer. These tires were placed on a test automobile which was driven over a standard road test course. The results of this test follow.

| | |
|---|---|
| Refractivity intercept | 1.0487 |
| Viscosity-gravity constant | 0.885 |
| Aromatic carbon atoms _____percent__ | 20 |
| Naphthenic carbon atoms _____do____ | 39 |
| Paraffinic carbon atoms _____do____ | 41 |
| Aromatics, silica gel _____ percent by weight__ | 46.0 |
| Billing weight _____lb./gal__ | 7.856 |

Percent aromatic carbon atoms, percent naphthenic carbon atoms, and percent paraffinic carbon atoms, as indicated above, refer to the approximate percents of carbon atoms which are aromatic carbon atoms, naphthenic carbon atoms and paraffinic carbon atoms respectively, in the oil, as determined by the n-d-M carbon type analysis disclosed in the book "Aspects of the Constitution of Mineral Oils," by Van Nes and Van Westen (1951), at p. 335.

After the test automobile was driven for the increment number of miles listed below, the tire treads were measured and the average tread wear of each ½ section of tire was measured in number of 0.001 inch of tread wear. This number divided into the number of miles driven prior to each measurement shows the average miles driven for each 0.001 inch of tread wear.

TIRE TEST RESULTS

| | U | V | W | X | Y | Z |
|---|---|---|---|---|---|---|
| Avg. Miles/0.001 Inch Tread Wear After: | | | | | | |
| 3,600 Miles | 114.5 | 97.9 | 126.1 | 92.7 | 102.8 | 111.1 |
| 7,200 Miles | 142.5 | 111.5 | 136.4 | 116.3 | 129.2 | 133.4 |
| 10,800 Miles | 152.4 | 104.8 | 126.2 | 108.8 | 121.8 | 127.7 |
| 14,400 Miles | 157.9 | 105.5 | 128.8 | 115.2 | 125.5 | 140.3 |

| Composition | U | V | W | X | Y | Z |
|---|---|---|---|---|---|---|
| Styrene-butadiene rubber containing 23.5 percent styrene and 6 percent by weight fatty acids | 100.0 | 100.0 | 100.0 | 100.0 | 100.0 | 100.0 |
| High abrasion furnace carbon black | 50.0 | | | | | |
| Easy processing channel carbon black | | 1.0 | 1.0 | 1.0 | 1.0 | 1.0 |
| Silica pigment | 50.0 | 50.0 | 50.0 | 50.0 | 50.0 | 50.0 |
| Zinc oxide | 5.0 | 5.0 | | | 5.0 | |
| 65% Diamylamine-ketone reaction product 35% N,N'-diphenyl-p-phenylene diamine | 1.0 | 1.0 | 1.0 | 1.0 | 1.0 | 1.0 |
| Phenyl-beta-naphthylamine | 1.0 | 1.5 | 1.5 | 1.5 | 1.5 | 1.5 |
| N-cyclohexyl-2-benzothiazole sulphenamide | 1.2 | | | | | |
| Benzothiazyl disulfide | | 0.75 | 0.75 | 0.75 | 0.75 | 0.75 |
| Di-o-tolyl guanidine | | 1.5 | 1.5 | 1.5 | 1.5 | 1.5 |
| Sulfur | 1.75 | 3.0 | 3.0 | 3.0 | 3.0 | 3.0 |
| Triethanol amine | | 1.0 | 1.0 | 1.0 | 1.0 | 1.0 |
| Stearic acid | | 3.0 | 3.0 | 3.0 | | |
| Coumarone-indene resin (100° C. M.P.) | | 10.0 | 10.0 | 10.0 | 10.0 | 10.0 |
| Asphaltic flux product | 5.0 | | | | | |
| Circosol 2XH | 5.0 | | | | | 5.0 |

Circosol 2XH is a product sold by the Sun Oil Company, Philadelpiha, Pa., and has the following typical properties and composition:

| | |
|---|---|
| Specific gravity at 60° F. | 0.9483 |
| Viscosity, SUS at 100° F. | 2,079 |
| Viscosity, SUS at 210° F. | 83 |
| Flash point, ° F. | 445 |
| Fire point, ° F. | 495 |
| Pour point, ° F. | .10 |
| Color, ASTM | 3.5 |
| Aniline point, ° F. | 174 |
| Refractive index | 1.5210 |

Basing the average miles listed under U as 100, the average miles as percent milage of U is as follows:

| | U | V | W | X | Y | Z |
|---|---|---|---|---|---|---|
| Percent of Carbon Black Control After: | | | | | | |
| 3,600 Miles | 100.0 | 85.5 | 100.0 | 80.9 | 89.7 | 97.2 |
| 7,200 Miles | 100.0 | 78.4 | 95.7 | 81.6 | 90.8 | 93.7 |
| 10,800 Miles | 100.0 | 67.7 | 83.0 | 71.5 | 79.9 | 83.7 |
| 14,400 Miles | 100.0 | 67.0 | 81.6 | 73.1 | 79.6 | 89.1 |

EXAMPLE III

The formulations of Table 1 were prepared:

TABLE 1

| Composition | I | II | III | IV | V |
|---|---|---|---|---|---|
| Styrene-butadiene rubber containing 6% residual fatty acids, basis weight of rubber, and 23.5 percent by weight styrene, basis weight of polymer | 100.0 | 100.0 | 100.0 | 100.0 | 100.0 |
| Easy processing channel carbon black | 1.0 | 1.0 | 1.0 | 1.0 | 1.0 |
| Silica | 50.0 | 50.0 | 50.0 | 50.0 | 50.0 |
| Zinc oxide | 0.0 | 0.5 | 1.0 | 3.0 | 5.0 |
| 65% diamylamine-ketone reaction product—35% N,N'-diphenyl-p-phenylene diamine | 1.0 | 1.0 | 1.0 | 1.0 | 1.0 |
| Phenyl-beta-naphthylamine | 1.5 | 1.5 | 1.5 | 1.5 | 1.5 |
| Benzothiazyl disulfide | 0.75 | 1.75 | 0.75 | 0.75 | 0.75 |
| Di-o-tolyl guanidine | 1.5 | 1.5 | 1.5 | 1.5 | 1.5 |
| Sulfur | 3.0 | 3.0 | 3.0 | 3.0 | 3.0 |
| Triethanol amine | 1.0 | 1.0 | 1.0 | 1.0 | 1.0 |
| Coumarone—indene resin (100° C. M.P.) | 10.0 | 10.0 | 10.0 | 10.0 | 10.0 |

Table 2 reports the results of physical testing of the rubber compositions listed in Table 1.

TABLE 2

| | I | II | III | IV | V |
|---|---|---|---|---|---|
| Optimum cure at 287° F. per min | 45 | 30 | 30 | 30 | 30 |
| Modulus, p.s.i.: | | | | | |
| 100% | 190 | 190 | 190 | 190 | 180 |
| 300% | 620 | 570 | 500 | 490 | 490 |
| 500% | 1,560 | 1,290 | 1,270 | 1,240 | 1,320 |
| Tensile, p.s.i | 3,290 | 3,280 | 3,140 | 2,720 | 2,710 |
| Elongation, percent | 640 | 680 | 670 | 640 | 630 |
| Hardness Shore A | 66 | 68 | 69 | 66 | 67 |
| Tear Die A, p.l.i | 240 | 260 | 250 | 250 | 250 |
| Sp. Gravity | 1.16 | 1.17 | 1.17 | 1.18 | 1.19 |
| Rebound, percent | 48.6 | 49.1 | 57.0 | 52.5 | 52.1 |
| Compression set, percent | 40 | 32 | 26 | 29 | 31 |
| Split tear, p.l.i | 97 | 100 | 97 | 72 | 74 |
| Mooney scorch MS at 250° F.: | | | | | |
| MV | 46 | 49 | 47 | 31 | 32 |
| $T_5$ | 16.4 | 14.5 | 17.6 | >30 | >30 |
| $T_{35}$ | 24.0 | 20.0 | 21.9 | >30 | >30 |

The compounds of Table 1 were subjected to the Goodyear-Huber Abrasion Test using as standard control test wheels natural rubber composition of the following recipe:

| | |
|---|---|
| Natural rubber | 100.0 |
| Zinc oxide | 3.0 |
| Stearic acid | 3.0 |
| Phenyl-beta-napthylamine | 1.0 |
| Pine tar oil | 3.0 |
| Easy processing channel black | 54.0 |
| Sulfur | 2.75 |
| Mercaptobenzothiazole | 0.9 |

Figure 2:
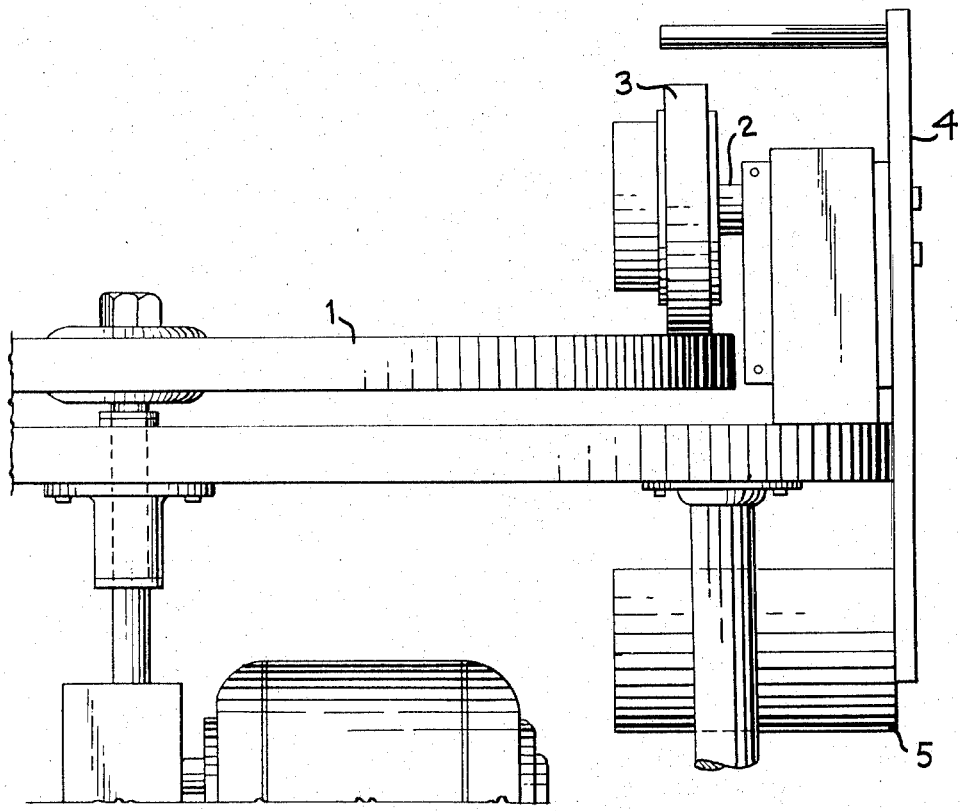
Figure 3:
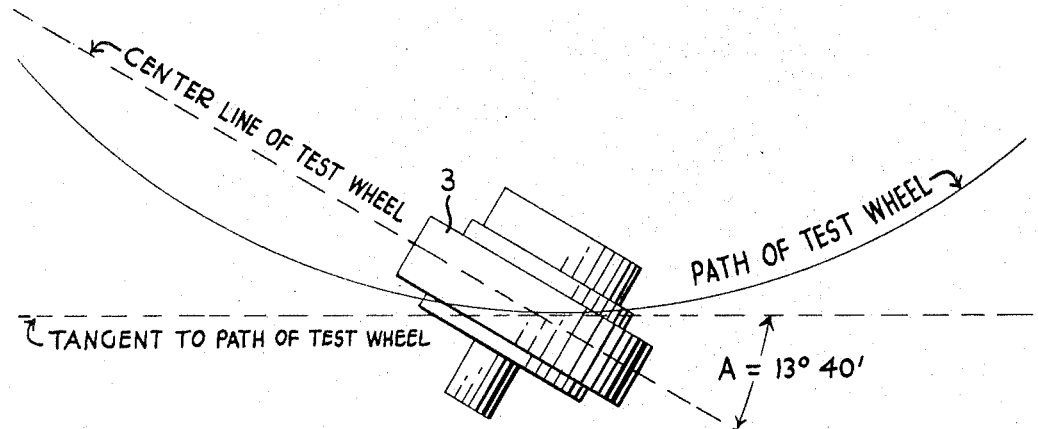

Referring to FIGURES 1 and 2 of the drawings, the Goodyear Angle Abrader consists essentially of a motor driven carborundum wheel 1. The carborundum wheel 1 is 24 inches in diameter and 1½ inches thick. Spaced equidistantly about the circumference of wheel 1 are 8 freely rotating spindles 2. These spindles 2 are so placed that when test wheels 8 are mounted on them the test wheels 3 contact the wheel 1 at a point 1 inch from its outer periphery. Thus, contact of test wheels 3 with wheel 1 is along a circular track 22 inches in diameter. Test wheels 3 are 0.75 inch wide and are compressed against wheel 1 by a 32 pound total load. The load includes wheels 3, connecting member 4, spindle 2, and counterweight 5. An automatic counter 6 is operably associated with wheel 1. The counter can be preset to shut off the abrader after any predetermined number of wheel revolutions. The wheel is driven at a rate of 80 r.p.m. The spindles are adjusted such that the angle defined by the center line of the test wheels and a tangent drawn to the path of the test wheels is 13°40'. This angle A is illustrated in FIGURE 3.

Control wheels were made from stock which had been sheeted to form 0.100 to 0.150 inch thick. The sheeted stock was cut 1¼ inches wide with the grain in strips approximately 24 inches long. These strips were rolled on a 2½ inch spindle and weighed to from between 110 to 115 grams, exclusive of the weight of the spindle. The control wheels were then cured 73' at 280° F. Test wheels were made similar to the control wheels from sheeted stock of samples I, II, III, IV, and V. The test wheels were cured 40' at 287° F. A set of 12 test wheels was made for each of the five recipes. From each set of 12 wheels, 4 wheels were aged in a vented air-circulating oven for 96 hours at 121° C. The aged wheels were marked for individual identification. The unaged wheels were similarly marked for individual identification in two groups of four.

The following procedure was employed to test the 12 samples of each compound:

(1) The test wheels and control wheels were broken in by running them on the abrader until the surfaces of the wheels were essentially worn off and replaced by the abrasion pattern.

(2) Eight control wheels were weighed to the nearest 0.1 gram, placed on the 8 spindles, run for 800 revolutions of the stone and re-weighed.

(3) Four unaged test wheels were weighed to the nearest 0.1 gram, placed on every other spindle, run for 1,600 revolutions of the stone and reweighed.

(4) The control wheels of Step 2 were replaced on all 8 spindles, rerun for 800 revolutions and reweighed.

(5) The remaining 4 unaged test wheels were weighed to the nearest 0.1 gram and placed on the spindles used in Step 3. Four previously untested control wheels were weighed to the nearest 0.1 gram, and placed on the remaining 4 spindles. These 8 wheels were run for 1,600 revolutions and reweighed.

(6) The control wheels tested in Steps 2 and 4 were replaced on the 8 spindles, rerun for 800 revolutions and reweighed.

(7) The 4 aged test wheels were weighed and placed on the spindles used for the test wheels in Steps 3 and 5. The control wheels tested in Step 5 were replaced on their respective spindles. The 8 wheels were run for 1,600 revolutions and reweighed.

Prior to the test procedure, 8 standard control wheels were run on the spindles for 4,800 revolutions to bring the stone temperature to equilibriums. After the warm-up, the wheel was not allowed to stand for an appreciable time without running.

The average volume losses of the test wheels and control wheels were calculated for each step of the test procedure by dividing the average weight loss of the wheels by the specific gravity of the compounds from which the wheels were made. The average volume loss for the control wheels run in Steps 2, 4 and 6 of the procedure (800 revolutions) was multiplied by 2 to obtain an extrapolated value for a 1,600 revolution abrasion test.

Table 3 reports the abrasion losses obtained in the Goodyear-Huber Abrasion Test for Compounds I through V. It is readily apparent from the data in the table that the abrasion resistance of the basic compound represented by Compounds I through V decreases substantially with the addition of zinc oxide. Compound I, which contain no ZnO, gives the best abrasion resistance. Compound II which contains only 0.5 percent zinc oxide evidences somewhat less abrasion resistance than does Compound I. Compounds III, IV and V which contain progressively more zinc oxide offer progressively poorer resistance to abrasion:

TABLE 3.—ABRASION LOSSES REPORTED AS CUBIC CENTIMETERS

| Goodyear-Huber Abrasion Test | | | Control Wheels | | | | | Test Wheels | | |
|---|---|---|---|---|---|---|---|---|---|---|
| | | | Alone | | | With Test Wheels | | Alone | With Control Wheels | |
| Compound | Aged | Shore Hardness | Step 2 | Step 4 | Step 6 | Step 5 | Step 7 | Step 3 | Step 7 | Step 5 |
| I | No | 69 | 3.8 | 3.6 | | 3.6 | | 4.4 | 3.8 | |
| I | Yes | 82 | | | 3.4 | | 3.2 | | | 2.8 |
| II | No | 70 | 3.6 | 3.6 | | 3.6 | | 5.6 | 5.0 | |
| II | Yes | 83 | | | 3.6 | | 3.4 | | | 4.2 |
| III | No | 70 | 3.6 | 3.4 | | 4.0 | | 7.0 | 6.4 | |
| III | Yes | 82 | | | 3.4 | | 3.2 | | | 7.0 |
| IV | No | 66 | 3.4 | 3.4 | | 4.6 | | 8.6 | 7.8 | |
| IV | Yes | 76 | | | 3.4 | | 4.4 | | | 9.2 |
| V | No | 67 | 4.0 | 4.2 | | 4.8 | | 7.4 | 7.4 | |
| V | Yes | 75 | | | 3.4 | | 4.6 | | | 10.8 |

The silica employed in the above examples is a hydrated precipitated silica produced by the acidification of a soluble silicate. It has the following chemical and physical properties:

Chemical properties: Percent by weight
  $SiO_2$ content _____ 87
  Weight loss at 105° C. (free water determination) _____ 5
  Weight loss at ignition after determination of weight loss at 105° C. (bound water determination) _____ 10
  CaO content _____ 0.5
  $Al_2O_3$ content _____ 0.6
  $Fe_2O_3$ content _____max__ 0.2
  NaCl content _____ 1.0
  pH value _____ 7.0
Physical properties:
  Surface area, square meters per gram (BET)[1] _____ 150
  Particle diameter millimicrons (electron microscope) _____ 22
  As-is bulk density, pounds per cubic foot[2] __ 10
  Specific gravity _____ 1.95
  Oil absorption[3] _____ 135–165
  Refractive index _____ 1.45

[1] Determined by method of Brunauer, Emmett and Teller, Journal of the American Chemical Society, vol. 60, p. 309 (1938).
[2] Uncompacted material.
[3] Represents the grams of linseed oil required by 100 grams of Hi-Sil 233 to form a paste. For a description of the procedure see Gardner and Sward, "Physical and Chemical Examination of Paints, Lacquers, and Colors," 11th ed. published by H. A. Gardner Laboratories, Inc., Bethesda, Md., pp. 289–298 (1950).

All numerical values employed in the above examples represent parts by weight unless otherwise indicated.

Although the present invention has been described with particular reference to details of specific embodiments thereof, it is not intended that these details shall limit the scope of the invention except insofar as they are included in the accompanying claims.

I claim:
1. In compounding a silica-reinforced conjugated olefinic diene synthetic rubber to provide a sulfur vulcanizable composition suitable for use in the manufacture of tire treads, the improvement which comprises maintaining the composition essentially free of metal oxide activator while vulcanizing the composition with sulfur thereby improving the wear resistance of vulcanizates of said sulfur vulcanizable composition.

2. In compounding a silica-reinforced conjugated olefinic diene synthetic rubber to provide a sulfur vulcanizable composition suitable for use in the manufacture of tire treads, the improvement which comprises including in the composition less than 1 part by weight per 100 parts of rubber metal oxide activator while vulcanizing the composition with sulfur thereby improving the wear resistance of vulcanizates of said with sulfur vulcanizable composition.

3. The improvement of claim 2 wherein less than 0.5 parts by weight per 100 parts of rubber metal oxide activator is included in the composition.

4. In compounding a silica-reinforced styrenebutadiene polymer to provide a sulfur vulcanizable composition suitable for use in the manufacture of tire treads, the improvement which comprises maintaining the composition essentially free of metal oxide activator while vulcanizing the composition with sulfur thereby improving the wear resistance of vulcanizates of said sulfur vulcanizable composition.

5. The improvement of claim 4 wherein a non-reactive, nonpolar mineral oil is included in the sulfur vulcanizable composition.

6. The improvement of claim 5 wherein 2 to 50 parts per 100 parts of rubber of non-reactive non-polar mineral oil is included in the sulfur vulcanizable composition.

7. A rubber tire comprising as a tread component thereof a sulfur vulcanizate of a sulfur vulcanizable conjugated olefinic diene synthetic rubber polymer composition containing rubber-reinforcing silica pigment but essentially no metal oxide activator.

8. A rubber tire composition comprising as a tread component thereof a sulfur vulcanizate of a conjugated olefinic diene synthetic elastomeric polymer sulfur vulcanizable composition reinforced with silica filler and containing a nonpolar mineral oil but essentially no zinc oxide.

9. A rubber tire comprising as a tread component thereof a sulfur cured rubber vulcanizate of a conjugated olefinic diene synthetic rubber composition of a conjugated olefinic diene synthetic rubber polymer containing silica-reinforcing filler having an average ultimate particle size of less than 50 millimicrons but containing essentially no metal oxide activator.

10. A rubber tire comprising as a tread component thereof a sulfur vulcanized elastomer of an elastomer composition containing no zinc oxide and comprising a butadiene-styrene copolymer and silica-reinforcing filler having a number average ultimate particle size of less than 50 millimicrons.

11. A rubber tire comprising as a thread component thereof a sulfur vulcanized rubber of a rubber composition containing no zinc oxide comprising a conjugated olefinic diene synthetic rubber polymer, silica-reinforcing filler having a number average ultimate particle size of less than 50 millimicrons and a non-reactive non-polar oil.

12. A rubber tire comprising as a tread component thereof a sulfur vulcanized elastomer of an elastomer composition containing essentially no metal oxide activator and comprising a butadiene-styrene co-polymeric rubber, 30 to 100 parts silica-reinforcing pigment having a number average ultimate particle size of less than 50 millimicrons per 100 parts of rubber and from 2 to 50 parts of a non-reactive non-polar mineral oil per 100 parts of rubber.

13. A rubber tire comprising as a tread component thereof a sulfur vulcanized rubber of a rubber composition comprising a conjugated olefinic diene synthetic rubber polymer, 30 to 100 parts silica reinforcing filler having a number average ultimate particle size of less than 50 millimicrons per 100 parts of said rubber and from 2 to 50 parts of non-reactive non-polar mineral oil per 100 parts of rubber but containing no zinc oxide, said tread having at least 10 percent more tread wear than a tire made from a rubber composition which except for containing metal oxide activator corresponds to said rubber composition.

14. A sulfur vulcanizable composition suitable for use in the manufacture of the treads of tires comprising a conjugated olefinic diene synthetic rubber polymer, silica-reinforcing filler and a sulfur contributing vulcanizing agent, said sulfur vulcanizable composition being essentially free of metal oxide activator.

15. The sulfur vulcanizable composition of claim 14 wherein metal oxide activator is present in said composition in an amount less than 1 part by weight per 100 parts of rubber.

16. The sulfur vulcanizable composition of claim 14 wherein metal oxide activator is present in said composition in an amount less than 0.5 parts by weight per 100 parts of rubber.

17. The composition of claim 14 wherein said synthetic rubber polymer comprises butadiene-styrene copolymer.

18. The composition of claim 17 wherein said sulfur contributing vulcanizing agent is elemental sulfur.

19. The composition of claim 17 which additionally contains a non-reactive, non-polar mineral oil.

20. The composition of claim 19 wherein said non-reactive, non-polar mineral oil is present in an amount from 2 to 50 parts per 100 parts of rubber.

21. The composition of claim 14 wherein said silica reinforcing filler has an average ultimate particle size of less than 50 millimicrons.

References Cited

UNITED STATES PATENTS 2,764,572  9/1956  Pechukas _____ 260—762

FOREIGN PATENTS 1,251,288  12/1960  France.
918,758  2/1963  Great Britain.
584,075  2/1960  Belgium.

OTHER REFERENCES

Whitby "Synthetic Rubber," John Wiley and Sons, Inc., New York, 1954, pp. 394–395.

Bachmann et al., "Fine Particle Reinforcing Silicas and Silicates in Elastomers," In Rubber Chemistry and Technology, December 1959, vol. XXXVII, No. 5, pp. 1364, 1370, 1371 and 1381.

Bachmann et al., "Fine Particle Reinforcing Silicas and Silicates in Elastomers," In Rubber Chemistry and Technology, December 1959, vol. XXXVII, No. 5, pp. 1372–1373.

MORRIS LIEBMAN, *Primary Examiner.*

J. H. DERRINGTON, *Assistant Examiner.*

U.S. Cl X.R.

260—33.6, 41.5